United States Patent
Ozawa

(10) Patent No.: US 8,715,026 B2
(45) Date of Patent: May 6, 2014

(54) METHOD FOR DISASSEMBLING PLASMA DISPLAY DEVICE

(71) Applicant: Panasonic Corporation, Osaka (JP)

(72) Inventor: Tetsuro Ozawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/790,688

(22) Filed: Mar. 8, 2013

(65) Prior Publication Data

US 2013/0189893 A1     Jul. 25, 2013

Related U.S. Application Data

(63) Continuation of application No. PCT/JP2012/002671, filed on Apr. 18, 2012.

(30) Foreign Application Priority Data

Sep. 1, 2011 (JP) .................................. 2011-190301

(51) Int. Cl.
*H01J 9/24*     (2006.01)

(52) U.S. Cl.
USPC .............................. 445/23; 445/24; 313/582

(58) Field of Classification Search
USPC .............................. 313/582–587; 445/23–25
See application file for complete search history.

(56) References Cited

U.S. PATENT DOCUMENTS

2011/0132898 A1*  6/2011  Martinez et al. ............... 219/618
2011/0263175 A1   10/2011 Tsujiguchi et al.

FOREIGN PATENT DOCUMENTS

| JP | 2005-116346 A | 4/2005 |
| JP | 2006-128753 A | 5/2006 |
| JP | 2008-197376 A | 8/2008 |
| JP | 2011-200846 A | 10/2011 |
| JP | 2012-083581 A | 4/2012 |
| WO | WO-2010/082424 A1 | 7/2010 |

OTHER PUBLICATIONS

International Search Report dated May 2, 2012 from corresponding PCT Application No. PCT/JP2012/002671.

* cited by examiner

*Primary Examiner* — Britt D Hanley
*Assistant Examiner* — Kevin Quarterman
(74) *Attorney, Agent, or Firm* — McDermott Will & Emery LLP

(57) ABSTRACT

The present disclosure relates to a method for disassembling a plasma display device including PDP (11) having front plate (20) and rear plate (21), metal support plate (14) bonded to rear plate (21) of PDP (11) with bonding member (16) interposed therebetween, and circuit board (15) attached to metal support plate (14). The method includes performing irradiation with infrared rays from a side of front plate (20) constituting PDP (11) while air is sent to circuit board (15) attached to metal support plate (14) to heat bonding member (16) between PDP (11) and metal support plate (14) so as to decrease bonding strength, and then separating PDP (11) from metal support plate (14).

3 Claims, 3 Drawing Sheets

METHOD FOR DISASSEMBLING PLASMA DISPLAY DEVICE

RELATED APPLICATIONS

This application is a continuation of International Application No. PCT/JP2012/002671, filed on Apr. 18, 2012, which in turn claims the benefit of Japanese Application No. 2011-190301, filed on Sep. 1, 2011, the disclosures of which Applications are incorporated by reference herein.

TECHNICAL FIELD

The present disclosure relates to a method for disassembling a plasma display device.

BACKGROUND ART

In recent years, as image display devices appropriate for slimming and upsizing, plasma display devices using plasma display panels (hereinafter referred to as a PDP) have been mass-produced and rapidly diffused.

The PDP is mounted on a display section of the plasma display device. The PDP includes a front plate formed with a display electrode, a dielectric layer, a protective layer, and the like on a glass substrate, and a rear plate formed with an address electrode, a barrier rib, a phosphor layer, and the like on a glass substrate. The front plate and the rear plate are arranged as opposed to each other so as to form a minute discharge space between both substrates, and peripheral edges of both substrates are sealed by frit glass. A discharge space is filled with a discharge gas formed by mixing inert gases such as a neon gas (Ne) and a xenon (Xe) gas.

A metal support plate as a chassis member is pasted to the rear surface of the rear plate of the PDP with an adhesive joint member such as a thermally conductive sheet interposed therebetween. The metal support plate has a function as the chassis member as well as a function as a heat sink. The chassis member is used to be attached with a circuit board for driving the PDP, and the heat sink is used to efficiently dissipate heat generated by the drive of the PDP. Further, the plasma display device is mounted with a front frame and a back cover for protecting the PDP and the circuit board.

Incidentally, with the rapid diffusion of plasma display devices in recent years, the number of used and waste plasma display devices is on the rapid increase. Moreover, with an increase in production amount of plasma display devices, the absolute number of defective PDP units in a manufacturing process is also on the increase. Accordingly, from viewpoints of environmental issues and resource savings, it is becoming important to develop and introduce a technique of disassembling the used and waste plasma display device or the defective PDP unit generated in the manufacturing process so as to recycle members or reproduce them as raw materials.

Disassembling the plasma display device into a recyclable form requires separation of the PDP, the metal support plate, and the circuit board. Thereat, a variety of methods for separating the PDP unit have hitherto been proposed. For example, there has been proposed a method for heating the surface of a PDP by a hot plate to decrease bonding strength of a bonding member bonding the PDP and the metal support plate, so as to peel the PDP and the metal support plate from the bonding member (refer to PTL 1, for example).

For disassembling the plasma display device into a recyclable form, the plasma display device is collected to a disassembly plant. However, the number of disassembly plants for plasma display devices has hardly been changed with respect to the increase in number of disassembly processing on plasma display devices, and hence the number of disassembly processing per plant is on the increase. There has thus been a challenge to increase disassembly processing ability of the disassembly plant.

CITATION LIST

Patent Literature

PTL1: Unexamined Japanese Patent Publication No. 2005-116346

SUMMARY

The present disclosure relates to a method for disassembling a plasma display device including: a plasma display panel having a front plate and a rear plate; a metal support plate bonded to the rear plate of the plasma display panel with a bonding member interposed therebetween; and a circuit board attached to the metal support plate for driving the plasma display panel. The method includes performing irradiation with infrared rays from a side of the front plate constituting the plasma display panel while air is sent to the circuit board attached to the metal support plate to heat the bonding member between the plasma display panel and the metal support plate so as to decrease bonding strength, and then separating the plasma display panel from the metal support plate.

DESCRIPTION OF EMBODIMENT

Hereinafter, an embodiment of the present disclosure will be described with reference to the drawings.

Figure 1:
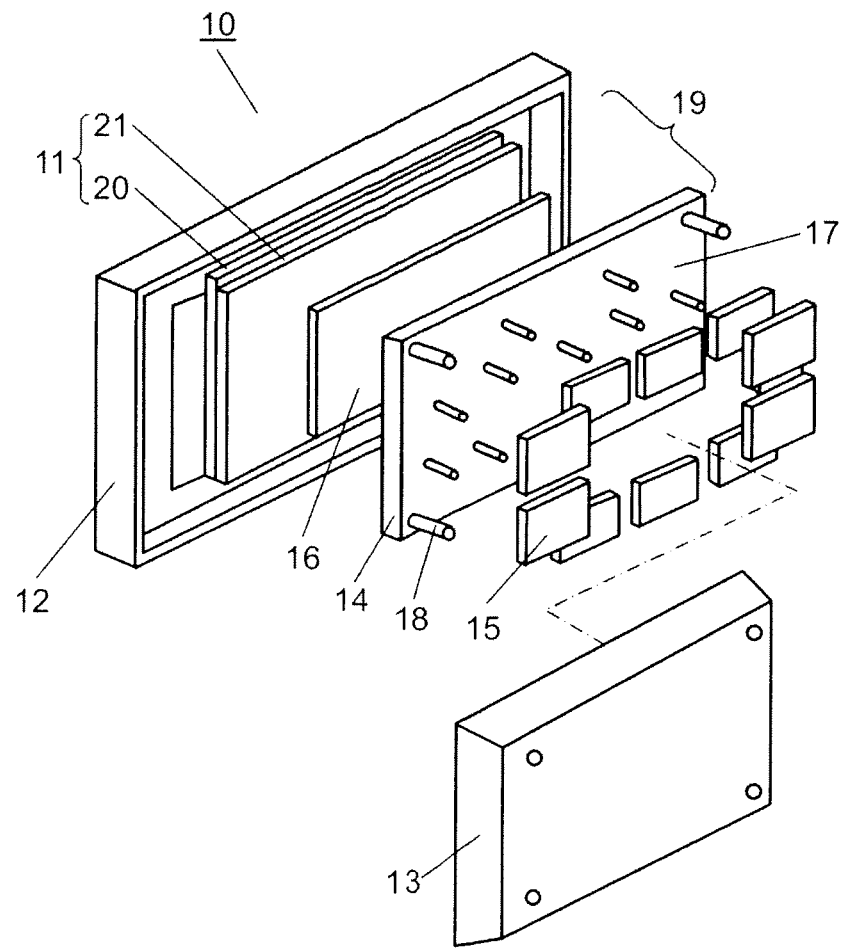
FIG. 1 is an exploded perspective view of a plasma display device in an embodiment of the present disclosure.
Figure 2:
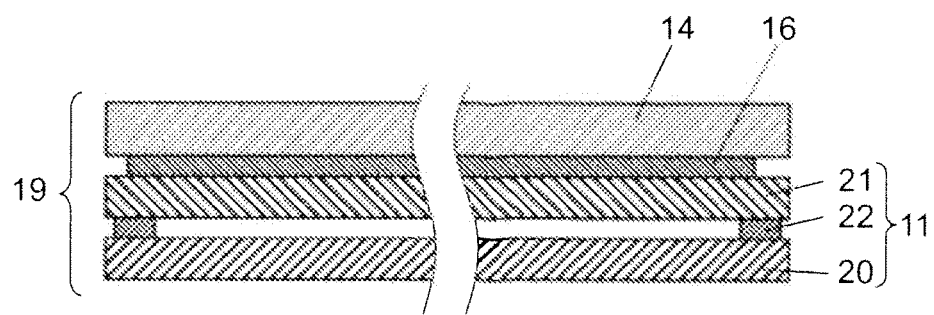
FIG. 2 is a sectional view of a PDP unit in the embodiment of the present disclosure.

FIG. 1 is an exploded perspective view of a plasma display device in an embodiment of the present disclosure, and FIG. 2 is a sectional view of a PDP unit in the present disclosure.

In FIG. 1, plasma display device 10 is provided with PDP 11 and a housing where this PDP 11 is housed. The housing is configured in combination of front frame 12 and back cover 13. Between front frame 12 and back cover 13, metal support plate 14, circuit board 15 and bonding member 16 are arranged. Metal support plate 14 includes a metal plate made of aluminum or the like as a material, and also serves as a heat sink. Circuit board 15 has been attached to metal support plate 14, and has a drive circuit for driving PDP 11. Bonding member 16 is a thermally conductive bonding sheet, and arranged between PDP 11 and metal support plate 14 to bond PDP 11 and metal support plate 14, while conducting heat generated from PDP 11 to metal support plate 14. Further, metal support plate 14 is provided with attachment 18 such as a fixing pin on attached surface 17 opposed to back cover 13. Back cover 13 and circuit board 15 are fixed by means of this attachment 18. As thus described, plasma display device 10 is arranged with PDP unit 19 including PDP 11 and metal support plate 14 which are bonded with bonding member 16 interposed therebetween.

Next, a detailed structure of PDP unit 19 will be described with reference to FIG. 2. PDP unit 19 has PDP 11 and metal support plate 14 which are bonded with bonding member 16 interposed therebetween. PDP 11 includes front plate 20 and rear plate 21 which are made of glass with a thickness of 1.8 mm to 2.8 mm, and peripheral edges thereof are joined by sealing member 22 such as frit glass. Bonding member 16 is a thermally conductive bonding sheet applied with a bonding agent on both surfaces thereof. Bonding member 16 is arranged almost over rear plate 21 and metal support plate 14, and bonded with rear plate 21 and metal support plate 14. Bonding member 16 transfers heat, generated at the time of driving PDP 11, to metal support plate 14 and suppresses temperature rises of front plate 20 and rear plate 21 at the time of driving PDP 11. This can reduce thermal expansion of front plate 20 and rear plate 21 due to the temperature rise, so as to prevent cracking and image deterioration of PDP 11.

Next, a method for disassembling plasma display device 10 will be described with reference to FIGS. 3 and 4.

Figure 3:
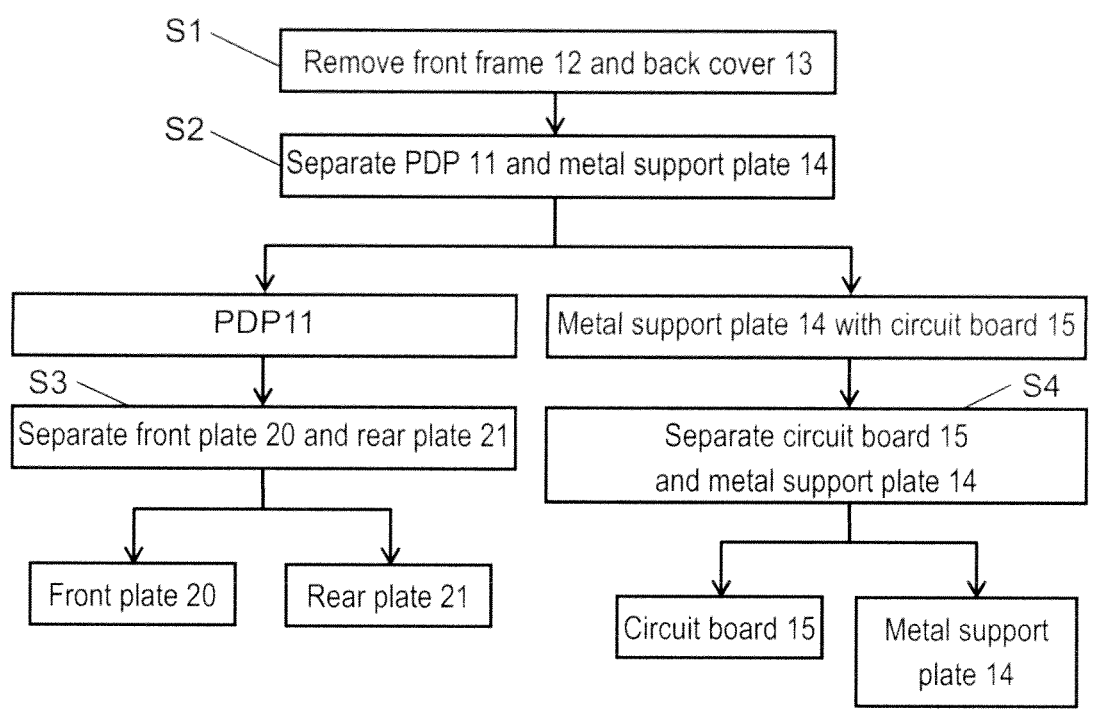
FIG. 3 is a flowchart explaining disassembly of the plasma display device in the embodiment of the present disclosure.

As shown in FIG. 3, first, front frame 12 and back cover 13 are removed from plasma display device 10 (S1).

Next, as for PDP unit 19, bonding member 16 is heated by infrared-ray irradiation to reduce bonding strength, so as to separate PDP 11 and metal support plate 14 in the state of being attached with circuit board 15 (S2).

Then, front plate 20 and rear plate 21 constituting PDP 11 are separated (S3). Constituents such as an electrode and a dielectric formed in each of glass substrates constituting front plate 20 and rear plate 21 are removed, and thereafter, the glass substrates are subjected to dissolution treatment or the like, so as to be recycled as glass materials. Next, circuit board 15 is removed from metal support plate 14 (S4).

Figure 4:
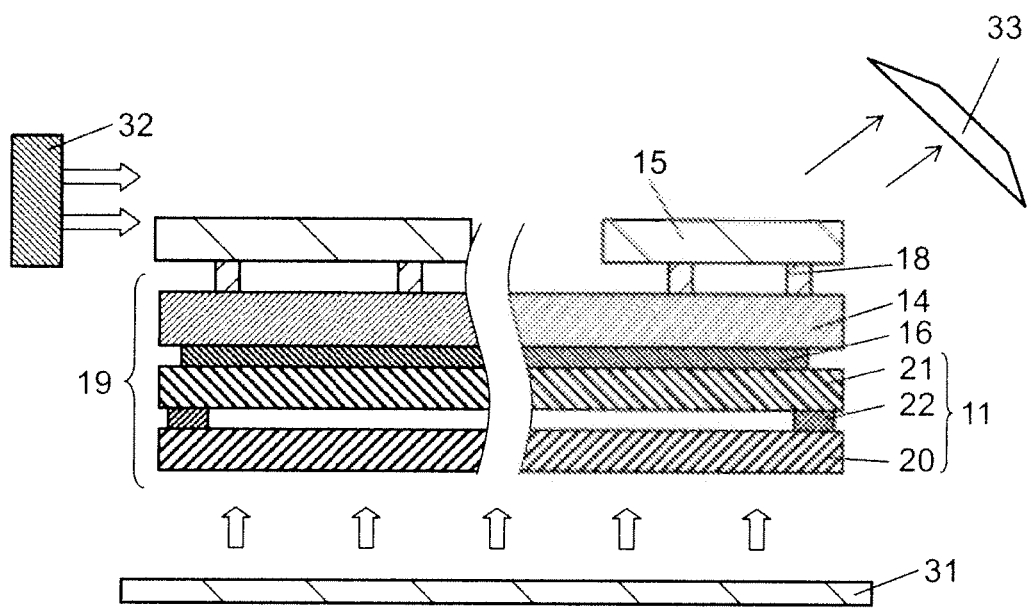
FIG. 4 is a sectional view showing a status of use of a disassembly device in the embodiment of the present disclosure.

FIG. 4 is a schematic view explaining the process of separating PDP 11 from metal support plate 14 (S2). As shown in FIG. 4, PDP unit 19 is disassembled by use of a disassembly device having infrared ray emitting section 31, fan 32 that feeds cold air for cooling circuit board 15, and exhaust duct 33. This disassembly device has infrared ray emitting section 31 for irradiating PDP unit 19 with infrared rays, and fan 32 for sending cooling air to circuit board 15 attached to metal support plate 14. PDP unit 19 is placed so as to be irradiated with infrared rays from the front plate 20 side of PDP 11. Further, the cooling air from fan 32 flows centering around circuit board 15. Accordingly, at the time when PDP unit 19 is irradiated with infrared rays and heated, the cooling air from fan 32 is exhausted from exhaust duct 33 placed on the leeward side along with an odor of an adhesive dissipated from bonding member 16. Further, the working environment is also improved in the disassembled of PDP 11 or PDP unit 19.

Next, a disassembly method for separating PDP 11 from metal support plate 14 will be described in detail. First, an orientation of fan 32 is adjusted so as to efficiently feed cooling air to circuit board 15, and the cooling air is allowed to flow, while exhaust duct 33 provided on the leeward side is simultaneously activated. A volume of the cooling air and a volume of air of exhaust duct 33 are both set to 1.0 m/sec.

A heater of infrared ray emitting section 31 is energized with the flow of the cooling air in a stable state. For heating, infrared rays with a peak wavelength of 1.2 μm and an output of 3.5 W/cm² were used.

PDP 11 is irradiated with infrared rays emitted from infrared ray emitting section 31. Front plate 20 of PDP 11 has a structure including a scan electrode, a dielectric layer, a protective layer, and the like on the glass substrate, but since about 85% thereof is transparent, most of the infrared rays, with which the irradiation was performed, are transmitted through front plate 20. Since the electrode, phosphor, and the like are applied all over rear plate 21, about 30% of the infrared rays, with which the irradiation was performed, are transmitted, but the rest thereof is all absorbed in rear plate 21. Due to this absorption, a temperature of rear plate 21 sharply rises, and simultaneously, bonding member 16 tightly joined with rear plate 21 is also rapidly heated. This bonding member 16 is rapidly heated by direct heating by infrared rays and thermal conduction from rear plate 21.

As thus described, when bonding member 16 is rapidly heated to a temperature at which its bonding strength decreases, for example to a temperature of about 200° C., the bonding strength of bonding member 16 decreases, thereby allowing peeling of PDP 11 and metal support plate 14 in a short time.

Normally, when heating is performed while cooling air is allowed to flow to a matter to be heated, there occurs a problem of deterioration in heating efficiency due to deprivation of added thermal energy. However, the use of infrared rays as a heating means enables direct heating of an object to be heated by radiation, so as to exclude losses in heating.

Herein, for confirming the effect according to the present disclosure, there were measured the maximum reached temperature of circuit board 15 during heating of bonding member 16 and odor strength of an atmosphere in the case of fan 32 and exhaust duct 33 being activated and in the case of those not being activated. A commercially available odor sensor was used for the odor strength.

As a result, the maximum reached temperature of circuit board 15 was 170° C. and the maximum odor strength was 520 in the case of fan 32 and exhaust duct 33 not being activated, whereas the reached temperature was 90° C. and the maximum odor strength was 82 according to the present disclosure. Further, the time until the temperature of bonding member 16 reached 200° C. was 4 minutes in the case of fan 32 and exhaust duct 33 not being activated, and it was 4.5 minutes in the case of those being activated, hardly having an influence on heating efficiency.

In addition, although infrared rays with a peak wavelength of 1.2 μm were used in the above example, since heating by infrared rays is performed by radiation, the effect is not restricted by the peak wavelength. Further, although the volumes of air of fan 32 and exhaust duct 33 were both set to 1.0 m/sec., the volumes of air are not restricted to this value, and may be some other value so long as a temperature rise of circuit board 15 is suppressed and the odor from bonding member 16 can be removed.

As thus described, according to the present embodiment, irradiation is performed with infrared rays from front plate 20 side of PDP 11 while cooling air is sent to circuit board 15 attached to metal support plate 14. Accordingly, bonding member 16 between PDP 11 and metal support plate 14 is heated, thereby allowing a decrease in bonding strength of bonding member 16. It is thus possible to facilitate separation of PDP 11 and metal support plate 14 in a short time.

Further, at the time of heating of bonding member 16 to a temperature at which its bonding strength decreases, since a temperature increase of circuit board 15 attached to metal support plate 14 is suppressed by cooling air fed from fan 32, it is possible to reduce generation of harmful gases caused by the temperature increase of circuit board 15.

Further, since an odor derived from an adhesive that is dissipated from bonding member 16 by exhaust duct 33 can be exhausted, it is possible to suppress deterioration in operating environment, and realize a favorable operating environment.

In addition, as for fan 32 and exhaust duct 33, one with another configuration may be used so long as having the cooling function and the exhaust function described in the present embodiment.

Industrial Applicability

The present disclosure is useful in efficiently disassembling a used plasma display device and a defective plasma display device generated in a manufacturing process step.

| REFERENCE MARKS IN THE DRAWINGS | |
|---|---|
| 10 | plasma display device |
| 11 | PDP |
| 12 | front frame |
| 13 | back cover |
| 14 | metal support plate |
| 15 | circuit board |
| 16 | bonding member |
| 19 | PDP unit |
| 20 | front plate |
| 21 | rear plate |
| 22 | sealing member |
| 31 | infrared ray emitting section |
| 32 | fan |
| 33 | exhaust duct |

The invention claimed is:

1. A method for disassembling a plasma display device, the plasma display device including:
   a plasma display panel having a front plate and a rear plate;
   a metal support plate bonded to the rear plate of the plasma display panel with a bonding member interposed therebetween; and
   a circuit board attached to the metal support plate for driving the plasma display panel,
   the method comprising:
   performing irradiation with infrared rays from a side of the front plate to heat the bonding member between the plasma display panel and the metal support plate so as to decrease bonding strength, while cooling air is sent to the circuit board; and then
   separating the plasma display panel from the metal support plate.

2. The method for disassembling a plasma display device according to claim 1, further comprising:
   ventilating surrounding air of the plasma display panel during the irradiation with infrared rays, while the cooling air is sent to the circuit board.

3. A method for disassembling a plasma display device, the plasma display device including:
   a plasma display panel having a front plate and a rear plate;
   a metal support plate bonded to the rear plate of the plasma display panel with a bonding member interposed therebetween; and
   a circuit board attached to the metal support plate for driving the plasma display panel,
   the method comprising:
   performing irradiation with infrared rays from a side of the front plate to heat the bonding member between the plasma display panel and the metal support plate so as to decrease bonding strength, while air is blown to the circuit board;
   after performing the irradiation, separating the plasma display panel from the metal support plate; and
   ventilating surrounding air of the plasma display panel during the irradiation with infrared rays by using an exhaust duct disposed on a downward side of the blown air.

* * * * *